United States Patent Office 2,873,194
Patented Feb. 10, 1959

2,873,194

VITAMIN FORTIFIED CANNED-FISH ANIMAL FOOD

George Wilkinson, Lomita, and William A. Eaton, Palos Verdes Estates, Calif., assignors to The Quaker Oats Company, Chicago, Ill., a corporation of New Jersey No Drawing. Application May 11, 1956
Serial No. 584,189

3 Claims. (Cl. 99—188)

This invention relates to canned food for animals, and more particularly involves canned-fish foods for pets such as cat foods or dog foods.

Many pet foods are produced from salt-water fish taken off the North American coasts, which contain enzymes destructive to vitamin $B_1$ (thiamine), which vitamin is essential in animal foods and especially in cat foods. Since these destructive enzymes or thiaminases are present in the major tonnage of fish used for the indicated purposes, it is important, if posisble, to destroy or eliminate the effects of the enzymes without affecting the quality of the food when canned. The mentioned salt-water fish include particularly those of the herring family, but there are others, and in fact many fresh-water fish usable for cat food contain thiaminases.

It is therefore a particular object of the present invention to provide a fish food for pets, especially cats, which contains at the time of consumption by the animal an adequate amount of thiamine.

It is a further object of the invention to provide a process for manufacturing such a fish food which results in adequate thiamine content and in a food of suitable texture.

The only satisfactory method for disposing of the objectionable enzymes or thiaminases is heat treatment, and the only desirable heat treatment for canned-fish foods takes place after the fish has been placed in the cans, which of course means that fortifying vitamin $B_1$ must have been introduced into the food prior to the cooking or heat treatment, as a result of which, under ordinary procedures, the thiaminases present in the fish would destroy the vitamin $B_1$.

It is therefore a further object of the invention to provide a method for supplying the thiamine to the fish product filling the cans to be heat-treated in such a manner or form that the thiamine is protected against the destructive enzymes until these enzymes or thiaminases have themselves been destroyed.

A related object is to produce protective agents for the fortifying vitamin $B_1$ by means of hard pellets, preferably food pellets, containing the vitamin and protecting it through a stage of thiaminase destruction.

Other objects of the invention, and the various features thereof, will become apparent to those skilled in the art, from a study of the following specification.

Briefly, the invention includes producing a relatively hard pellet containing adequate proportions of thiamine and an appropriate pelleting food substance such as an acceptable cereal meal or animal meal and then introducing a quantity of these pellets into the fish stock being used to fill the cans. The conventional or other cans are then closed or sealed and heated for an adequate period up to a temperature of about 250° F. to kill the thiaminases during such cooking or retorting, the hard pellets sufficiently resisting encroachment of moisture from the fish, containing the enzymes, to preserve an adequate proportion of the fortifying vitamin $B_1$ of the pellets. Thus, around 50% of the fortifying vitamin may be preserved during the stage of destroying the thiaminases. During storage, or between the times of retorting and consumption, the hard pellets in the cans gradually assume a mushy consistency in the fish so that they blend adequately in the entire food product.

Therefore, an important aspect of the invention is the pellets and their physical constitution. We have discovered that fortifying thiamine may be provided as a constituent in hard pellets produced from certain cereal meals, or in some instances from meat meals or fish meals, all of such meals preferably being meals of high protein content. It is preferred generally to use soybean meal, which has high protein content, and, when passed through pelleting machines and aged for several hours, becomes adequately hard.

Soybean meal of commerce is employed, this being a meal ground to pass a screen of about 10 mesh per inch, or somewhat coarser or finer as required, and commonly used for feeding. Such meal has a moisture content in the order of 8% to 12%, or perhaps between 5% and 15%. Into this meal there is uniformly distributed by any manner of agitation about 75 grams of thiamine hydrochloride or mononitrate per 2,000 pounds of soybean meal, or approximately 37.5 milligrams per pound. During distribution of the thiamine in the meal the temperature of the mass is raised to about 180° F., or within a range between 110° F. and 200° F. In view of the natural moisture content of the soybean meal, approximating perhaps 10%, and with or without added moisture, the mixed mass of the indicated temperature forms a thick paste. This paste is introduced into any conventional pelleting apparatus or other apparatus, which may be in the nature of a rotary mill also carried at the indicated temperature in the order of 180° F. and through which the mass is forced under high pressure through extruding orifices of required diameter, for example about ¼ inch. In this apparatus the pellets are sheared off to such lengths as desired, for example ⅜ inch lengths. The dimensions of these pellets are, of course, not critical and may be somewhat shorter or longer or somewhat smaller or greater in diameter. After leaving the pelleting machine the pellets are preferably allowed to dry and age for a number of hours, for example 24 hours. During this interval the moisture content drops appreciably and facilitates hardening. For example, a moisture content of around 15% to 20% will drop to 5% to 10%, in a drying time of 10 to 30 hours.

From the standpoint of appropriate hardness of the pellets to perform the required function, they will run on the Mohs' hardness scale from about hardness 1 to hardness 3, or from a hardness which will scratch talc but not gypsum, up to a hardness which will scratch gypsum but not calcite, this varying in accordance with the original moisture content of the meal and more particularly in accordance with the drying or aging time. In some instances of greater drying the hardness may be such as to scratch calcite. Such hardnesses in pellets furnish the necessary mentioned characteristic of sufficiently resisting moisture encroachment in the product being retorted and packaged.

In preparing the fish product, when the fish stock is prepared, there is mixed therewith about 3% by weight of the described thiamine fortified pellets. Such mixing preferably takes place at around 170° F. or, acceptably, within a temperature range around 150° F. to 200° F., and the percentage of pellets may be varied in accordance with their thiamine concentration so as to meet the thiamine ratio required in the final product. Such fish mix is then packed into cans in conventional commercial practice and passed to a retorting operation where the product in the cans is raised to about 250° F. where it is retained for a time sufficient to kill the enzymes or thiaminases initially present. Usually this time is about one hour, but according to product variations it might fall within a range of one-half hour to two hours. While there are several destructive enzymes or thiaminases, none of these are known to be killed at temperatures as low as 165° F. or 170° F. However, at temperatures around 250° F. or within a range from about 240° F. to 260° F., such thiaminases are killed within the indicated time interval and at the normally existent pH which is around pH 6, or within the range of about pH 5.8 to pH 6.8.

During the time required for retorting, the hard thiamine-containing pellets described sufficiently resist the inroads of water from the fish containing the described enzymes so that at least 25% and ordinarily about 50% of the fortifying thiamine is retained, and this is a permanent retention. This proportion, of course, must be sufficient for the desired final thiamine content in the packaged food.

The pellets have the further advantage, in addition to their capacity to preserve the necessary proportion of thiamine, of gradually breaking down to a sort of mushy consistency in the packaged food so that they blend with the fish in which they are contained. Thus, a fish product is yielded which is adequate in thiamine content and has an ordinarily desired fish food texture. If the fish were separately heated to kill the thiaminases before adding thiamine, the fish texture breaks down into a shapeless mass and is objectionable as a food product.

The usual fish product of the indicated nature contains about 10% to 20% of some desired cereal in the total product. More or less of this, as desired, may be contained in the fortified pellets. For example about 10% of the total cereal of the product may be in the form of the pellets, in which case the thiamine percentage in the cereal would be around one half as much as above described where about 3% of the cereal is in pellet form. In other words only about 18 or 20 mgm. of thiamine hydrochloride or mononitrate per pound of meal would be then employed for the pellets. Of course, the amount of thiamine could be doubled, for example, in the pellets, in which case the percentage of pellets added would be correspondingly reduced, or, all the cereal could be pellets. Or the thiamine might be again doubled. Thus, an over-all variation of thiamine might range between about 15 mgm. and 150 mgm. per pound of meal in the pellets.

As a substitute for soybean meal in the pellets, cottonseed meal could be used, or peanut meal, or even linseed meal, if processed preliminarily to destroy thiaminases present, or other good pelleting meals. Wheat shorts, wheat middlings, and wheat are scarcely satisfactory substitutes for soybean meal because the pellets produced from them do not compress adequately and do not become sufficiently hard. Some meat meals and some fish meals compress to adequately hard pellets and may therefore be used alone or in admixture with the described soybean meal or equivalent cereal meals. In general, most of the high-protein-content meals, of whatever type, may be satisfactorily used as soybean meal replacements, the criterion being the production of sufficiently hard pellets to protect or preserve the fortifying thiamine contents of the pellets by adequately resisting inroads, while heating, of fish moisture containing the thiaminases into the pellets in which otherwise too much of the thiamine would be destroyed and the thiamine content in the final product reduced below that required by the animal by which the food is to be consumed.

Other foods normally containing thiamine-destructive enzymes or thiaminases and which are to be processed at temperatures high enough to destroy the thiaminases may likewise be prepared according to this invention by incorporation of thiamine fortified hard pellets such as here disclosed. Similarly other fortifying vitamins may be protected in preparing foods containing enzymes destructive to such vitamins.

Thus, a fish food is produced in which cereal or other high protein pellets, tablets, particles or other enveloping materials containing the required vitamin are introduced to protect the vitamin during retorting to destroy the vitamin-destroying enzymes, such pellets or particles disintegrating in the fish product after several hours or a few or several days following processing and sealing. All the usual cereal used in such foods may be introduced into the food with the vitamin, e. g. 20%, or only a small part such as 1%, and corresponding portions of the vitamin used, such as about one milligram per pound where all cereal contains the thiamine, or up to 150 or even 300 milligrams per pound where only about 1% of the cereal contains the thiamine. Where the term "thiamine" is used, it is intended to signify a common form in which it is usually employed, such as thiamine hydrochloride or mononitrate previously mentioned.

The invention claimed is:

1. A method of producing a food from fish naturally containing thiamine destroying enzymes including: preparing such a fish stock for canning; mixing with the fish stock hard pellets containing thiamine, the hard pellets having the characteristic of resisting substantial inroads of hot moisture from the fish for about two hours; packing the fish-pellets mixture into cans; closing the cans; and retorting the cans and fish contents for one-half to two hours at temperatures approximating 250° F. to kill the thiaminases.

2. A method as in claim 1 wherein the pellets are produced from high-protein meal and have a hardness between about 1 and 3 on Mohs' scale.

3. A method as in claim 1 wherein the pellets are compressed soybean meal pellets.

References Cited in the file of this patent

UNITED STATES PATENTS

| | | |
|---|---|---|
| 1,918,983 | Prince | July 18, 1933 |
| 1,964,867 | Allyn | July 3, 1934 |
| 2,322,270 | Atkin | June 22, 1943 |
| 2,410,417 | Andersen | Nov 5, 1946 |
| 2,685,517 | Dunmire | Aug. 3, 1954 |
| 2,694,642 | Westphal et al. | Nov. 16, 1954 |